Patented Apr. 3, 1951

2,547,136

UNITED STATES PATENT OFFICE 2,547,136

METHOD OF PREPARING A WHIPPING AGENT FROM CASEIN

Elmer Bernhard Oberg and Carl Eugene Nelson, Milwaukee, Wis., and Cloyce Leroy Hankinson, Minneapolis, Minn., assignors to Carnation Company, Milwaukee, Wis., a corporation of Delaware No Drawing. Application May 24, 1947,
Serial No. 750,370

6 Claims. (Cl. 99—20)

This invention relates to a food product and method of preparing the same, and it is particularly concerned with a product derived from the casein fraction of milk which may be beaten to provide a useful whipped material or whipping agent having many of the properties and uses of egg whites.

The food industry in general, and candy manufacturers in particular, use large quantities of egg whites in the making of their products, this egg white ingredient serving as a foaming and lifting agent. The use of egg whites entails certain disadvantages. Egg white powder is somewhat less soluble in water than is desired, and its usual high cost makes it desirable to develop a comparable product from skim milk as described in the present process.

In the milk industry, large volumes of skim milk are produced as an incident to butter manufacture. While a number of uses for milk of this character have already been proposed, it is desirable from an economic standpoint that its market and field of use be even further broadened.

It is an object of this invention to provide an improved food product derived from milk. A more particular object is to provide a food product derived from the casein component of low-fat or skim milk which may be used as a whipping agent with syrups or sugars to form foam-like products having high film strength and good keeping qualities. Still another object is to provide a product of the character described which may be supplied in either a water soluble, powder form or in the form of a liquid, and which may be kept in storage for long periods of time without deteriorating.

These and other objects will become apparent from the following description of our invention.

We have discovered that a liquid having excellent whipping qualities may be prepared from milk by precipitating the casein ingredient therefrom, subjecting the casein to suitable digestion with an enzyme, and separating from the digest so formed a detrimental and undesirable fraction or component. The resulting fluid, when formulated with sugars or syrups, may be beaten to provide useful whipped products, or it may be stored and used at a later date. Further, the fluid may be dried to the powder form and preserved in this condition.

In the first step of our process, the casein component of milk is separated therefrom in the usual manner, a low-fat milk normally being used. Soft, easily dispersed casein curds are those best adapted for use in this invention, and curds of this character may be obtained by warming the milk to a temperature of about 35° C. and slowly adding dilute hydrochloride or other mineral acid until a pH of about 4.1 to 4.5 is reached. The curd which results from this treatment is then separated from the whey component of the milk and is then washed free of other major impurities.

The casein curds are then broken up and dispersed in water. While the curd-water ratio is not critical, we prefer than the resulting mixture contain from about 5 to about 25 per cent by weight of curd solids.

It is to be understood that casein in any conveniently available form may be used either in conjunction with, or as a substitute for, the casein curds described herein.

The casein present in the curd-water mixture is next subjected to digestion by means of a suitable enzyme. Under suitable conditions, any one or more of various proteolytic enzymes may be used, including trypsin, erepsin, pepsin, papain, and ficin, trypsin having been found to be the most satisfactory for purposes of this invention. The enzyme is normally added in the form of a water dispersion, and it is preferred that the amount of enzyme added comprise from about 1 to about 5 per cent of the amount of curd present, both enzyme and curd being calculated on a dry weight basis. The pH of the mixture is then adjusted to that which is optimum for the particular enzyme used, an acid condition being established when pepsin is employed, while neutral or slightly alkaline conditions are used with the other enzymes mentioned above. Digestion of the casein is now accomplished by heating the mixture to a temperature at which the enzyme becomes activated but below that at which the particular enzyme used may be destroyed. For trypsin, pepsin, and erepsin, an optimum digestion temperature is from about 40 to 50° C., while with papain, and ficin, an optimum temperature is from about 50 to 60° C. In any event, care should be observed that the temperature of the solution does not rise above 80° C. since this and higher temperatures are generally destructive of enzymatic materials. This digestion step at elevated temperatures is preferably carried on for a period of from about 1 to 5 hours for all the above enzymes except pepsin which being much slower in its action requires several days. As a result of the foregoing treatment, there is formed a digest having a dissolved casein fraction and an undissolved casein fraction. The latter fraction, which is normally held in the colloidal state, is an undesirable one, and subsequent steps are directed in part to a removal of this undesired portion of the digest.

Following the step of digestion with enzyme, the pH of the digest is adjusted to between about 4.0 and 8.0, a pH of about 5.5 to 6.5 being preferred. The digest is then preferably heated at a temperature of from about 80° to about 100° C. until the undesirable portion of the digest is transformed from the colloidal state into one of a more readily separable coagulate. This normally requires that the digest be heated for a period of from about 1 to 2 hours, the solution being slowly stirred during the entire heating interval. Treatment of the solution in this manner also destroys any enzyme present. It is important that agitation of the solution or digest be kept to a minimum during this heating step since the precipitate formed is readily dispersed, and the agitation should be sufficient only to prevent local overheating. Further, while the period of heating may be somewhat less or greater than two hours, a lesser time or no heat treatment tends to result in a more difficult separation of the said undesirable fraction, while a longer period of heating may result in a browning of the remaining portion of the digest. Heating the digest containing solution for as little as 5 minutes will often suffice to kill the enzyme, but the solution remains difficult to filter unless a longer heating period be employed.

After the heating step described in the preceding paragraph is complete, the solution is filtered hot to remove its undesired precipitated component, a plate and frame type of filter being conventionally used for this purpose. In certain instances, the filtration may be speeded up if the bulk of the precipitate is first removed by a centrifuging operation. This filtering step is that intended when reference is made hereinafter to a clarification step.

The resulting filtrate is itself a useful whipping agent and may be used for whipping purposes with syrup or sugar if desired, in which case the pH of the filtrate is first preferably adjusted to about 7.5, which results in a more stable whip than is obtained with lower pH's.

When it is desired to maintain the casein derivative in storage for any appreciable length of time, the product may be either dried to form a powder, or a preservative such as sugar or syrup may be added to the solution. In general, when a powder is the desired product, a 30-40 per cent solids solution is the most economical one with which to work from a practical operating standpoint, and a solution of this character may be dried either by a conventional spray or vacuum-drum process.

In the normal practice of our invention, the casein-derived whipping agent described above is whipped in conjunction with a quantity of sugar, syrup, or both these ingredients. In the case of a casein derived whipping agent which has been preserved by the addition of a suitable amount of sugar or syrup, it may not be necessary to add further quantities of those ingredients when the material is whipped. In practice, however, the sugar or syrup content of the preserved material is even further increased before whipping.

As an illustration of the manner in which the invention described finds application, the following example is given:

*Example*

It was desired to prepare a powdered casein digest which would readily dissolve in water to provide a solution having excellent whipping qualities.

1,000 pounds of skim milk were placed in a vat and there heated to 35° C. To the warm milk was then slowly added a quantity of 10 per cent solution of hydrochloric acid sufficient to lower the pH of the milk to pH 4.3. The casein component of the milk was thereby precipitated as a soft curd, and this curd was then freed of whey and washed with water. The resulting washed curd, which weighed about 90 pounds, was then dispersed in a vat containing about 25 gallons of water. In this concentration, the mixture had a solid content of about 10 per cent.

To the curd-water mixture was then added 1800 cc. of a 10 per cent suspension of trypsin in water, followed by the gradual addition of a quantity of 5 per cent solution of sodium hydroxide sufficient to raise the pH of the mixture to pH 8. During the addition of the sodium hydroxide, the mixture was heated to a temperature of 50° C. and was maintained at this temperature for a period of two hours. The mixture was continuously agitated while addition of the enzyme and the alkali was made, as well as during the subsequent period of heating.

Immediately after the foregoing treatment had been completed, the solution was again acidified with a quantity of hydrochloric acid, and the pH thereby lowered to 6. The temperature of the mixture was then raised to 95° C. and was maintained at this temperature for a period of two hours. During the heating step, care was taken to agitate the mixture only to the extent necessary to prevent local overheating.

The hot mixture was then filtered through a plate and frame type filter to remove an undesirable fraction which precipitated in the acid mixture as the latter was heated in the manner described above. The resulting filtrate, which had a solid concentration of about 10 per cent, was then evaporated under vacuum until its solids concentration reached 40 per cent. This concentrated solution was then refrigerated for a period of 12 hours, after which it was again filtered to remove a crystalline precipitate formed during the refrigeration period.

A quantity of a 25 per cent solution of sodium hydroxide sufficient to raise the pH of the mixture to 7.5 was then added to the filtrate. The resulting alkaline solution was then subjected to a spray drying operation and yielded approximately 22 pounds of the desired powder.

The powder obtained in the manner described above was then placed in closed containers and kept in storage for a period of 12 months. The containers were opened at the end of this period of storage, and the powder was found to be in substantially the same condition as it was when first prepared. There was no evidence that the powder had deteriorated in any manner.

The powder obtained above was found to dissolve readily in water, and it was successfully used in preparing a number of whips. In one of these tests, approximately ½ pound of corn syrup and ¼ pound of cane sugar were mixed together, and the resulting solution was heated to a temperature of about 110° C. A further quantity of ½ pound of corn syrup was then added to the above solution and mixed therewith. Twelve grams of the casein-derived powder was then dissolved in 68 grams of water, and this solution was then added to the hot syrup-sugar solution as the latter was stirred. The final solution was then beaten at high speed for about 3 minutes to provide the whip. This whip had all the characteristics of one prepared from egg whites beaten with sugar or syrup, and the foam of the casein-derived whip maintained its structure, without drainage, for a period of at least 48 hours at 37° C. This whip, and others similar to it, were used in the manufacture of various candy products as a substitute for the whipped egg white ingredient normally employed. Tests made on the resulting candy products demonstrated that the whips derived from digested casein were the full equivalent of egg white whips, both from the standpoint of taste as well as quality of product.

The final whip as prepared in the previous paragraph had a volume to weight ratio of 2 when volume is expressed in cubic centimeters and the weight in grams. In practice it is desirable that a whip prepared as above have a volume to weight ratio of at least this value. Any value less than 2 would indicate too dense a product, that is, an inferior whipping agent, and the whip would be described as having poor volume. However, the stability of the whip is just as important as the volume weight ratio. A good whip must have both good volume (low density) and good stability. By good stability we mean freedom from drainage on standing.

The following table shows the outstanding results obtained with the various enzymes by the heating and clarification steps following the enzyme digestion treatment as described above.

*Characteristics of whip as determined by treatment of digest*

| Enzyme | Without Clarification | | With Clarification | |
|---|---|---|---|---|
| | Vol.-Wt. Ratio | Stability | Vol.-Wt. Ratio | Stability |
| | Cc./g. | | Cc./g. | |
| Trypsin | 1.9 | Very Poor | 2.3 | good. |
| Papain | 1.4 | Fair | 2.0 | Do. |
| Ficin | 1.3 | ---do--- | 2.0 | Do. |
| Pepsin | 1.5 | Good | 2.2 | Do. |

The above table shows that we have been able to obtain both of these desirable characteristics—good volume and good stability—by our treatment as described in the foregoing paragraphs.

We claim:

1. In a method of manufacture of a powdered whipping agent derived from milk, the steps comprising separating from milks its casein component in the form of a curd; dispersing said curd in water to form a mixture; adding to said mixture at least one proteolytic enzyme; partially digesting said mixture under appropriate temperature and pH conditions to activate the enzyme; making the resulting partial digest slightly acid and heating it at between 80° and 100° C. for a period of from 1 to 2 hours to destroy said enzyme and to precipitate the undigested fraction; filtering said partial digest to remove the said precipitate; concentrating the resulting filtered solution; making the solution alkaline; and drying the said alkaline solution to provide the said powder.

2. The method of manufacturing a whipping agent having a solid ingredient derived from milk, comprising warming and acidifying milk to separate its casein component in the form of a curd; dispersing said curd in water to form a mixture; adding an alkaline material to said mixture to attain therein a pH of about 7.5 to 8.5; adding to said alkaline mixture a quantity of at least one enzyme selected from the group consisting of trypsin, erepsin, papain, and ficin; heating said mixture at a temperature from about 40° C. to about 60° C. for a period of at least about 1 hour to form a digest having a dissolved casein fraction and an undissolved casein fraction; adding an acid material to said digest to attain therein a pH of from about 4 to about 7; heating said digest at a temperature above about 80° C. for a period of at least about 1 hour to destroy said enzyme and to precipitate said undissolved casein fraction; filtering said digest to remove said undissolved fraction; and making the resulting filtrate alkaline; the alkaline filtrate so obtained comprising the said whipping agent.

3. The method of claim 2 wherein there is added the step of drying the alkaline filtrate to provide a powder, said powder comprising the said whipping agent.

4. The method of manufacturing a whipping agent having a solid ingredient derived from milk, comprising warming and acidifying milk to separate its casein component in the form of a curd; separating and washing said curd and dispersing the washed curd in water to form a mixture; adding to said mixture a quantity of acid and a quantity of pepsin; heating the mixture at a temperature between about 40° and about 60° C. for a period of at least about 24 hours to form a digest comprising a dissolved casein fraction and an undissolved casein fraction; adjusting the pH to a range of from about 4 to about 7; heating said digest at a temperature above about 80° C. for a period of at least 1 hour to destroy said enzyme and to precipitate the undissolved fraction; filtering said digest to remove said undissolved fraction; and making the resulting filtrate alkaline, the alkaline filtrate so obtained comprising the said whipping agent.

5. The method of claim 4 wherein there is added the step of drying the alkaline filtrate to provide a powder, said powder comprising the said whipping agent.

6. The method of manufacturing a whipping agent having a solid ingredient derived from milk, comprising warming said milk and adjusting the pH thereof to about 4.1 to about 4.5 by addition of an acid material, the casein component of said milk being thereby separated in the form of a curd; dispersing said curd in water to form a mixture; adding an alkaline material to said mixture to attain therein a pH of about 7-8; adding to said mixture from about 1 to about 5 per cent by weight of at least one enzyme selected from the group consisting of trypsin, erepsin, papain, and ficin, said percentage being expressed in terms of the weight of dry curd and enzyme; heating said mixture at a temperature of about 40° to 50° C. for a period of about 2 hours to form a digest comprising a dissolved casein fraction and an undissolved casein fraction; adding an acid material to said digest to attain therein a pH of about 6; heating said acidified digest at a temperature of from about 90° to about 95° C. for a period of about 2 hours to destroy said enzyme and to precipitate the undissolved casein fraction in said digest; filtering said digest to remove said undissolved fraction; and adjusting the pH of the resulting filtrate to about 7.5 by addition of an alkaline material; said alkaline filtrate comprising the said whipping agent.

ELMER BERNHARD OBERG.
CARL EUGENE NELSON.
CLOYCE LEROY HANKINSON.

(References on following page)

REFERENCES CITED

The following references are of record in the file of this patent:

UNITED STATES PATENTS

| Number | Name | Date |
|---|---|---|
| 597,378 | Backhaus | Jan. 18, 1898 |
| 750,832 | Dunham | Feb. 2, 1904 |
| 1,654,176 | Kohman | Dec. 27, 1927 |
| 1,754,825 | Heuser | Apr. 15, 1930 |
| 1,840,392 | Hill | Jan. 12, 1932 |
| 1,922,510 | Urquhart et al. | Aug. 15, 1933 |
| 2,068,738 | File | Jan. 26, 1937 |
| 2,180,637 | Kemmerer | Nov. 21, 1939 |
| 2,225,553 | Conquest | Dec. 17, 1940 |
| 2,319,186 | Ingle | May 11, 1943 |
| 2,343,713 | Spur | Mar. 7, 1944 |
| 2,376,693 | Helmer et al. | May 22, 1945 |
| 2,381,407 | Levinson et al. | Aug. 7, 1945 |
| 2,391,559 | Faulkner | Dec. 25, 1945 |

OTHER REFERENCES

"The Determination of Curd Tension by the Use of Hydrochloric Acid-Pepsin Coagulant," by D. Miller, Journal of Dairy Science, April 1935, vol. XVIII, No. 4, pp. 259 to 264.

"Colloid Aspects of Food Chemistry and Technology," by W. Clayton, published J. & A. Churchill, London, 1932, pages 165, 166, 206, 227 to 231.